US005343775A

United States Patent [19]

Easton et al.

[11] Patent Number: 5,343,775

[45] Date of Patent: Sep. 6, 1994

[54] CONTROL LEVER ASSEMBLY

[75] Inventors: David J. Easton, Cedar Falls; Terence D. Pickett, Waterloo, both of Iowa

[73] Assignee: Deere & Company, Moline, Ill.

[21] Appl. No.: 55,171

[22] Filed: Apr. 28, 1993

[51] Int. Cl.[5] .......................... G05G 5/06; F16F 1/00

[52] U.S. Cl. .......................... 74/532; 74/527; 74/528; 74/526; 267/150

[58] Field of Search .................. 74/527, 528, 523, 526, 74/531, 473 R, 475, 471 XY, 536; 267/150

[56] References Cited

U.S. PATENT DOCUMENTS

| | | | |
|---|---|---|---|
| 4,064,768 | 12/1977 | Smith et al. | 74/528 |
| 4,109,547 | 8/1978 | Jacobson | 74/526 |
| 4,121,065 | 10/1978 | Woodard | 74/536 X |
| 4,222,474 | 9/1980 | Choudhury et al. | 74/528 |
| 4,419,907 | 12/1983 | Baxter et al. | 74/531 |
| 4,438,660 | 3/1984 | Kittle | 74/531 |
| 4,440,040 | 4/1984 | Kittle et al. | 74/527 |
| 4,458,549 | 7/1984 | Tani et al. | 74/473 R |
| 4,490,710 | 12/1984 | Kopsho et al. | 74/471 XY |
| 4,515,032 | 5/1985 | Olmsted | 74/473 R |
| 4,543,842 | 10/1985 | Katayama | 267/150 X |
| 4,569,245 | 2/1986 | Feldt et al. | 267/150 X |
| 4,739,967 | 4/1988 | Bowden | 74/531 |
| 5,167,308 | 12/1992 | Osborn | 74/528 X |

FOREIGN PATENT DOCUMENTS

| | | | |
|---|---|---|---|
| 0504003 | 9/1992 | European Pat. Off. | 267/150 |
| 3433092 | 3/1986 | Fed. Rep. of Germany | 74/528 |
| 61-205530 | 9/1986 | Japan | 267/150 |
| 4-310432 | 11/1992 | Japan | 74/528 |

*Primary Examiner*—Vinh T. Luong

[57] ABSTRACT

A lever assembly includes a housing having a pivot slot formed in one end thereof. A lever has a pivot pin slidably and pivotally received in the slot and is pivotal from a centered position to displaced positions. An end of the lever carries a roller. The pivot slot is elongated in a direction which is tilted at an angle with respect to a longitudinal axis of the lever when the lever is in its centered position. A lever spring is biassed to urge the lever to its centered position. The housing also forms a stop which is engagable with the lever to prevent pivoting of the lever into a first displaced position unless the pivot pin slides within the slot and towards the stop. The housing also forms a detent device which engages the roller and releasably holds the lever in a displaced position. Portions of the housing integrally form the stop and the detent device. The detent device is formed in part by a movable member which projects from a central portion of the housing. The movable member forms a first operating surface which faces generally towards the slot, a second operating surface which is tilted with respect to the first operating surface and which faces generally away from the lever when the lever is in its centered position. The operating surfaces are engagable with the roller. A detent spring is biassed to urge the movable member towards the slot.

18 Claims, 3 Drawing Sheets

CONTROL LEVER ASSEMBLY

BACKGROUND OF THE INVENTION

The invention relates to control lever assembly for generating signals as a function of the position of a manually operable lever.

Increasingly, electrohydraulic valves are being used on agricultural vehicles, such as tractors, to operate various vehicle or implement hydraulic functions. New operator input devices are needed to take advantage of the capabilities of such electrohydraulic valves. Various designs have been proposed in attempts to solve this problem. For example, U.S. Pat. No. 4,419,907, issued 13 Dec. 1983 to Baxter et al., U.S. Pat. No. 4,440,040, issued 3 Apr. 1984 to Kittle et al. and U.S. Pat. No. 4,438,660, issued 27 Mar. 1984 to Kittle, all assigned to the assignee of the present application, show various types of multiple mode control lever assemblies. However, a less complex and less costly lever operated device is desired. Also desired is such a device which can generate output signals which vary linearly as a function of the position of the device within a certain range of positions, which can generate output signals which vary in a step-wise manner in response to a predetermined motion of the device, and which provides tactile feedback to an operator depending on the position of the device and indicative of the character of the output signals being generated. Also desired is such a device which provides a smooth and uniform lever movement within a certain range, which provides a stepwise increase in resistance to lever movement outside of such a range, which requires lever movement in a different direction to move the lever outside of such a range and which provides a detent function to releasably hold the lever in a certain position. Such a lever can provide tactile feedback to make an operator aware of the functional status of the lever and the hydraulic function controlled thereby.

SUMMARY OF THE INVENTION

Accordingly, an object of this invention is to provide a control lever assembly which provides a smooth and uniform lever movement within a certain range, and which provides an stepwise increase in resistance to lever movement outside of such a range.

A further object of the invention is to provide such a control lever assembly which requires lever movement in a different direction to move the lever outside of such a range.

Another object of the invention is to provide such a control lever assembly which provides a detent function to releasably hold the lever in a certain position.

Another object of the invention is to provide such a control lever assembly which is simple and inexpensive.

These and other objects are achieved by the present invention, wherein a lever assembly includes a housing having a side wall and an end wall projecting therefrom. A pivot slot is formed in the end wall. A lever has a pivot pin slidably and pivotally received in the pivot slot and is pivotal about the axis of the pin. A lower end of the lever carries a roller and is forked. The forked end is coupled to an arm of a potentiometer. The pivot slot is elongated in a direction which is tilted at an angle with respect to a longitudinal axis of the lever when the lever is in its centered position. A lever spring is biassed to urge the lever to a centered position. The housing also forms a stop or abutment which is engagable with the lever to prevent pivoting of the lever into a first displaced position unless the pivot pin is moved within the pivot slot and towards the abutment. A detent device which engages the roller and releasably holds the lever in a displaced position. The detent device is formed in part by a flexible member which projects from a central portion of the housing. The operating surfaces are engagable with the roller. A detent spring is biassed to urge the flexible member towards the pivot slot.

DETAILED DESCRIPTION

Figure 1:
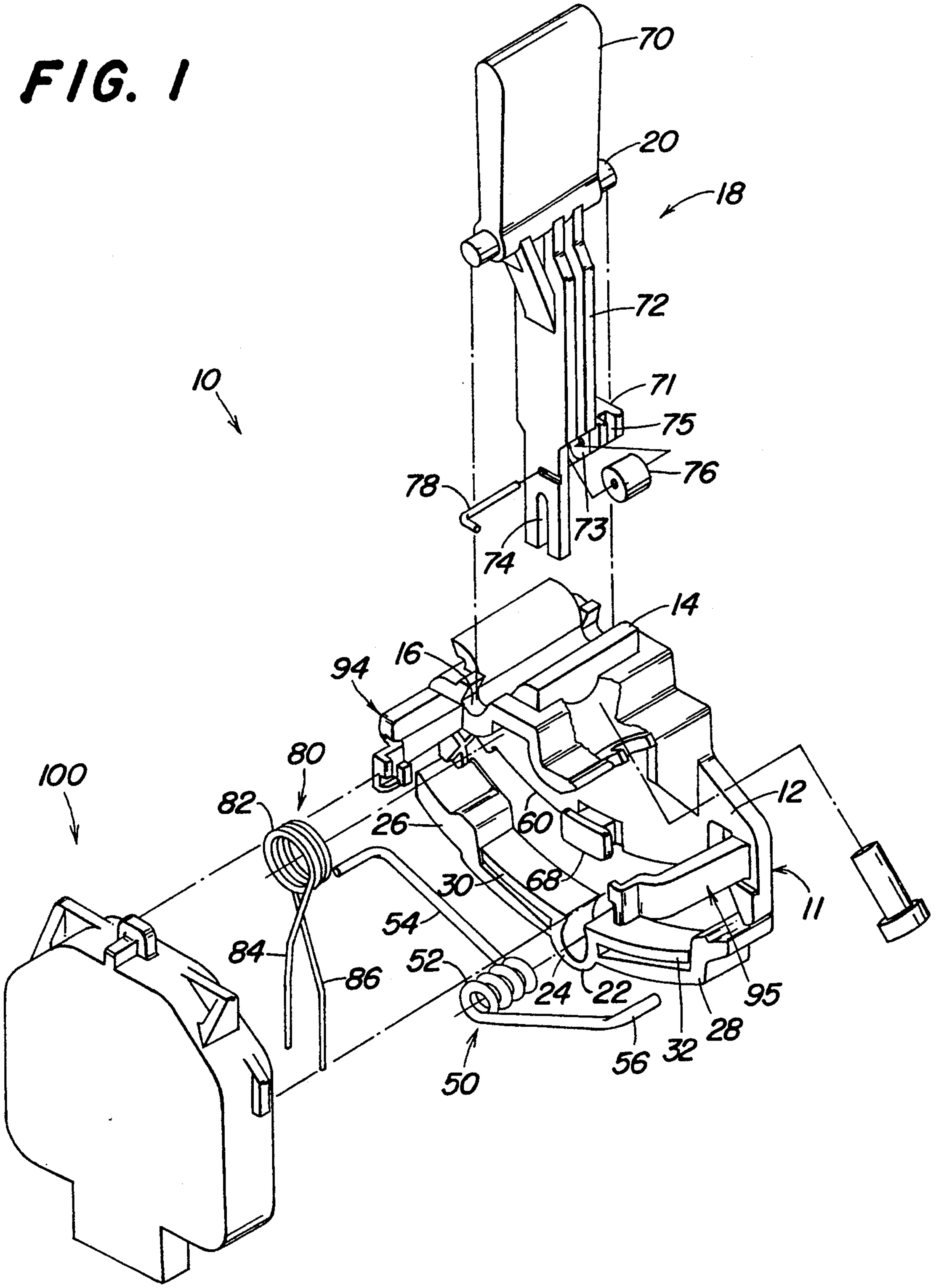
FIG. 1 is an exploded perspective view of a lever assembly according to the present invention.

Referring to FIG. 1, a lever assembly 10 includes a housing 11 having a side wall 12 and an end wall 14 projecting therefrom. A pivot slot 16 is formed in the end wall 14. A lever 18 has a pivot pin 20 slidably and pivotally received in the slot 16 and is pivotal clockwise and counterclockwise from the centered position (illustrated) to displaced positions on either side thereof. The pivot slot 16 is elongated in a direction which is perpendicular to the axis of pin 20 and which is tilted with respect to a longitudinal axis of the lever 18 when the lever 18 is in its centered position. The bottom surface of the pivot slot 16 is cylindrical.

A tab 22 projects from the bottom center of side wall 12 and away from the pivot slot 16. A bore 24 extends through the tab 22. A pair of detent members 26 and 28 extend generally away from each other and away from the outer end of the tab 22. A pair of curved ledges 30 and 32 extends away from and on both sides of the tab 22 part way to the lateral edges of the side wall 12. Ledges 30 and 32 are rigidly joined to side wall 12 along their entire length. Ledges 30 and 32 extend along an arc having a radius of curvature centered within the pivot slot 16 and form a smooth guide surface. The inner portions of the detent members 26 and 28 are spaced apart from and adjacent to corresponding portions of the ledges 30 and 32. The detent members 26 and 28 are joined to the side wall 12 only at their inner ends where they are joined to the tab 22. As a result, the outer ends of detent members 26 and 28 are able to bend or flex towards and away from the pivot slot 16.

Detent member 26 has a ridge 33 which forms a first operating or ramp surface 34 which faces generally towards the lever 18, a second operating surface 35 which faces generally towards the slot 16 and a third operating or ramp surface 36 which is tilted with respect to surface 35 and which faces generally away from the lever 18 when the lever 18 is in its centered position. Detent member 28 has a ridge 37 which forms a first operating or ramp surface 38 which faces generally towards the lever 18, a second operating surface 39 which faces generally towards the slot 16. A detent spring 50 has a coil 52 which is received in the bore 24 in the tab 22 and a pair of arms 54 and 56. Each of arms 54 and 56 engages a corresponding one of the detent members 26 and 28. Detent spring 50 is biassed to urge the outer ends of the detent members 26 and 28 towards the pivot slot 16. Detent spring 50 forms a resilient means which is coupled to the detent members 26 and 28 and urges them to a neutral position.

The side wall 12 forms a curved guide surface 60 which extends along an arc having a radius of curvature centered within the pivot slot 16. The side wall 12 also forms a first stop surface 62 which is joined to an end of the guide surface 60 and which is oriented generally perpendicular to the arc.

The side wall 12 also forms a second stop surface 64 which is spaced apart from the first stop surface 62 and which is also oriented generally perpendicular to the arc. The side wall 12 also forms a ledge 66 which joins the second stop surface 64 to the first stop surface 62. The ledge 66 extends generally parallel to the arc, and the distance between the slot 16 and the ledge 66 is greater than the distance between the slot 16 and the guide surface 60. A T-shaped spring tab 68 projects from side wall 12 and is aligned between pivot slot 16 and the center of ledges 30 and 32.

Figure 4:
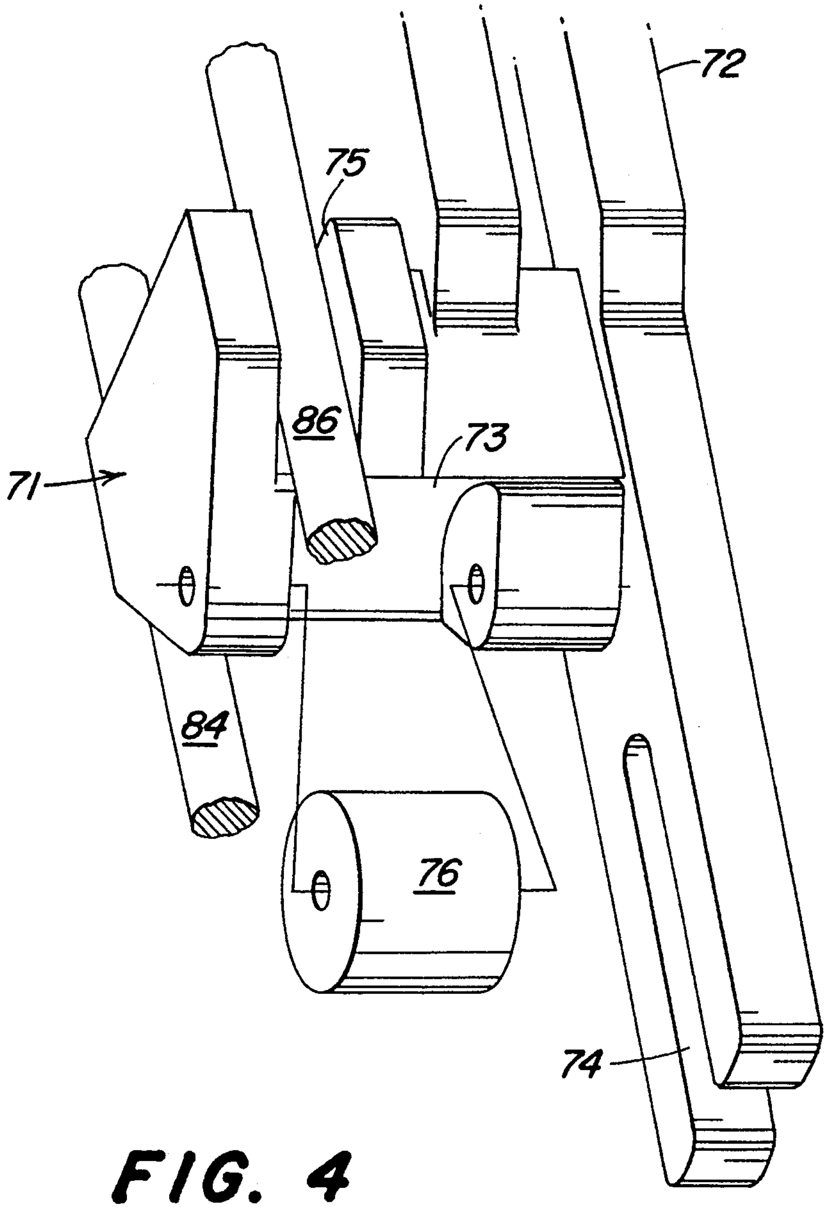
FIG. 4 is an enlarged detail view of a portion of the lever of the present invention.

The lever 18 includes a first arm 70 projecting away from the pivot pin 20 and a second arm 72 projecting from the pivot pin 20 and away from the first arm 70. Second arm 72 has a forked end which forms a groove 74. Arm 72 carries a roller 76 which is held in place by pin 78. A lever centering spring 80 includes a coil portion 82 and a pair of arms 84 and 86 projecting therefrom. Spring 80 forms a resilient means which is coupled between the lever 18 and the housing 11 and which urges the lever 18 to a neutral position. The arms 84 and 86 are engagable with the tab 68 and with the lower arm 72 of the lever 18, and are biassed to urge the lever 18 to its centered position. As best seen in FIG. 4, a member 71 projects from the side of arm 72 above the groove 74. The roller 76 is carried in a recess 73. The spring arms 84 and 86 are received by notches 75 formed in the member 71, of which only one is clearly visible.

A recess 90 is formed in the side wall 12 adjacent the outer end of ledge 30, and at least a portion of the ridge 33 is received by the recess 90. A similar recess 92 is formed in the side wall 12 adjacent the other end of ledge 32 and at least partially receives ridge 33.

Figure 3:
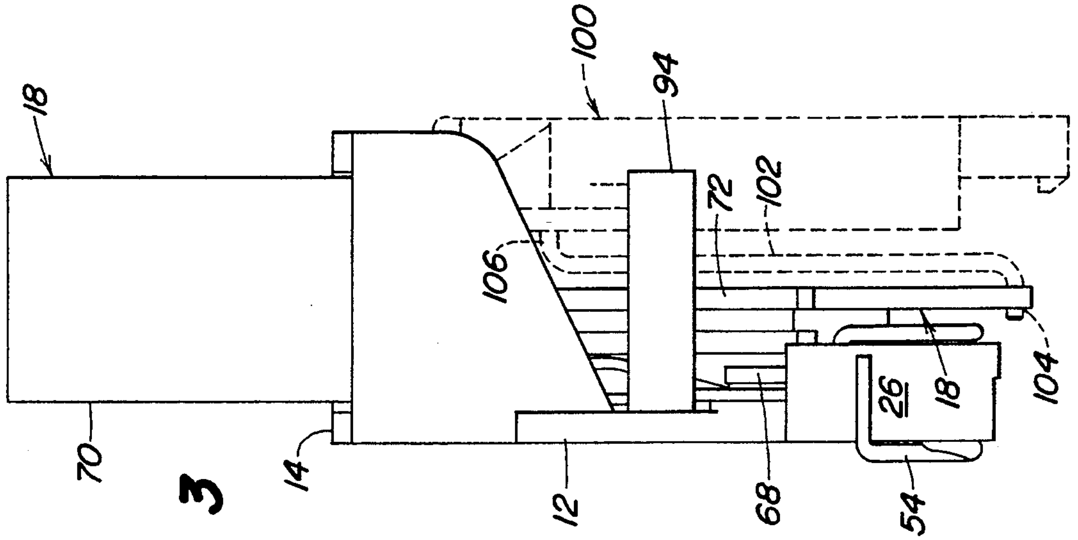
FIG. 3 is a view in the direction of arrows 3—3 of FIG. 2.

A pair of gripping arms 94 and 96 are located near opposite edges of the side wall 12 and extend perpendicular to side wall 12. As best seen in FIG. 3, the arms releasably grip a housing of a transducer 100, such as a potentiometer. An input arm 102 extends from transducer 100 to an end 104 which is received in the groove 74. As a result, pivoting of lever 18 will cause arm 102 to rotate about the axis of end 106 which is preferably coupled to a rotary potentiometer element (not shown) which is contained within the transducer 100. The transducer 100 will then be able to generate electrical signals corresponding to the pivotal position of the lever 18.

Figure 2:
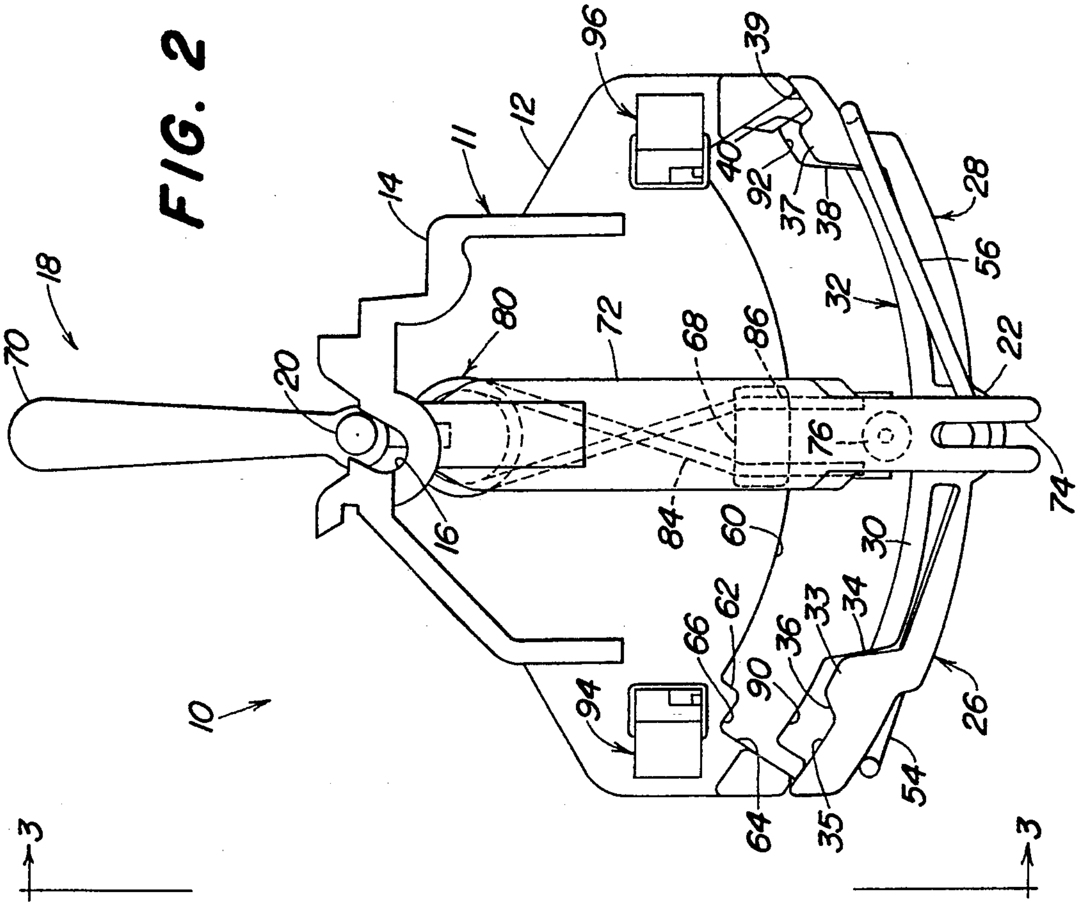
FIG. 2 is side elevation view of a lever assembly according to the present invention.

The transducer 100 may be constructed to generate an electrical signal which varies substantially linearly from a minimum voltage to a maximum voltage as the lever 18 from a position tilted approximately 45 degrees (for example) clockwise from its centered position viewing FIG. 2 to a position tilted approximately 45 degrees (for example) counter-clockwise from its centered position viewing FIG. 2. The transducer 100 may also include conductor and wiper elements (not shown) which operate as switch elements which open and close to generate a step-wise varying voltage signal as the lever 18 pivots. Preferably, these conductor and wiper elements (not shown) are arranged so that they operate as a switch which is toggled when the lever 18 is pivoted clockwise approximately 34 degrees (for example) into a detent position wherein the arm member 71 is moved past the stop surface 62 and the roller 76 is moved into engagement with surfaces 34 and 36 of detent member 26. The signals from the transducer 100 may be used, via a microprocessor and valve drivers, to control a solenoid operated electrohydraulic valve (not shown) such as a selective control valve on an agricultural vehicle or on an implement connected thereto.

As the lever is rotated in a clock-wise manner viewing FIG. 2, the roller 76 rolls smoothly across the ledge 30 and the lever is subject only to the resistance of the centering spring 80. Eventually, the roller will engage ramp surface 34 and this engagement causes a step-wise increase in resistance to pivoting of the lever 18. As the lever 18 continues to pivot in a clock-wise manner, the detent member 26 will pivot downwardly against the bias of spring arm 54. Eventually, the stop surface 62 engages the lever arm member 71 and prevents further pivoting of the lever 18 away from the centered position and into a first displaced position unless the pivot pin 20 is moved linearly within the slot 16 and towards the stop surface 62. When the lever 18 is moved to this first displaced position the roller 76 will engage surfaces 35 and 36, and surface 36 will engage roller 76 to releasably hold lever 18 in this first displaced position. Thus, the spring 50, the detent member 26 and the roller 76 cooperate to form a detent means or mechanism, and surface 62 and lever arm member 71 cooperate to require linear displacement of the lever 18 before it can be pivoted into its detent position.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A lever assembly comprising:

a cylindrical pivot pin;

a housing having a pivot slot formed therein, the pivot slot slidably and pivotally receiving the pivot pin, the pivot slot being elongated to permit sliding movement of the pivot pin in a direction which is perpendicular to a central axis of the pivot pin;

a lever coupled to the pivot pin, the lever comprising a first arm projecting away from the pivot pin and a second arm projecting from the pivot pin and away from the first arm, the lever being pivotal from a centered position to a displaced position;

a lever spring biassed to urge the lever to its centered position;

a stop member engagable with the lever to prevent pivoting of the lever away from the centered position and into a first displaced position unless the pivot pin slides within the slot and towards the stop member;

detent means for releasably holding the lever in the first displaced position; and means for coupling the lever to a transducer for generating electrical signals as a function of the position of the lever.

2. The lever assembly of claim 1 wherein the housing comprises:

a side wall, an end wall projecting from an end of the side wall, the pivot slot being formed in the end wall.

3. The lever assembly of claim 1 wherein the stop member comprises:

a curved guide surface which extends along an arc having a radius of curvature centered within the pivot slot;

a stop surface which is joined to an end of the guide surface and which is oriented generally perpendicular to the arc;

a ledge joined to the stop surface, the ledge extending generally parallel to the arc, a distance between the slot and the ledge being greater than a distance between the slot and the guide surface.

4. The lever assembly of claim 3 wherein:

portions of the housing integrally form the guide surface, the stop surface and the ledge.

5. The lever assembly of claim 1, further comprising:

a movable member comprising a first operating surface which faces generally towards the slot, a second operating surface which is tilted with respect to the first operating surface and which faces generally away from the lever when the lever is in its centered position, the operating surfaces being engagable with the lever; and resilient means biassed to urge the member towards the slot, the member and the resilient means cooperating to form the detent means.

6. The lever assembly of claim 5, wherein:

portions of the housing integrally form the movable member.

7. The lever assembly of claim 5, wherein:

the housing forms a curved wall spaced apart from the slot and extending along an arc having a radius of curvature centered within the pivot slot, the curved wall terminating at an end which is adjacent to the detent means.

8. The lever assembly of claim 7, further comprising:

a roller rotatably carried by the second arm, the roller being engagable with the curved wall, the stop member and the detent means.

9. The lever assembly of claim 5, wherein:

the housing forms a recess therein, at least a portion of the second operating surface being received by the recess.

10. The lever assembly of claim 1, further comprising:

a roller rotatably carried by the second arm for engagement with the stop member and the detent means.

11. The lever assembly of claim 1, wherein:

the housing comprises means for releasably coupling the transducer to the housing; and the second arm comprises means for engaging an input member of the transducer.

12. The lever assembly of claim 1, wherein the means for coupling the lever to a transducer comprises:

a rod having a first end coupled to the transducer and having a second end, the second end of the lever has a groove extending therein, the second end of the rod being slidably received by the groove.

13. A lever assembly comprising:

a housing comprising a side wall, an end wall projecting from an end of the side wall, the end wall forming a pivot slot therein, a curved wall projecting from the side wall remote from the end wall and extending along an arc having a radius of curvature centered within the pivot slot, and a member extending adjacent to the curved wall, the member having a plurality of operating surfaces formed thereon and being deflectable with respect to the side wall;

a lever pivotally supported by the slot and pivotal in a plane which is substantially parallel to the side wall, the lever comprising a first arm projecting from one side of the end wall and a second arm projecting from an opposite side of the end wall;

a roller rotatably carried by the second arm for engagement with the curved wall and the operating surfaces, pivoting of the lever moving the roller over a surface of the curved wall, out of engagement with the curved wall and into engagement with the operating surfaces;

first resilient means coupled between the lever and the housing for urging the lever to a neutral position; and second resilient means coupled to the member for urging the member to a neutral position.

14. The lever assembly of claim 13, wherein the member comprises:

a first operating surface which faces generally towards a central region of the housing and is tilted at an angle with respect to the arc;

a second operating surface which is substantially parallel to the arc and which spaced apart from the first operating surface; and a ridge located between the first and second operating surfaces and projecting generally towards the slot.

15. The lever assembly of claim 14, wherein the housing comprises:

a curved ridge which is spaced apart from and parallel to the curved wall;

a stop surface which is joined to an end of the ridge and which is oriented generally perpendicular to the arc; and a ledge joined to the stop surface, the ledge extending generally parallel to the arc, a distance between the slot and the ledge being greater than a distance between the slot and the ridge.

16. The lever assembly of claim 15, wherein:

the slot extends along an axis which is generally parallel to the stop surface.

17. The lever assembly of claim 13, wherein:

the lever comprises a pivot pin which is received within the slot, the pivot pin being slidable and pivotal within the slot.

18. The lever assembly of claim 17, wherein:

the slot is elongated in a direction which is perpendicular to an axis of the pivot pin.

* * * * *